US010850971B1

(12) United States Patent
Al Ghurair et al.

(10) Patent No.: US 10,850,971 B1
(45) Date of Patent: Dec. 1, 2020

(54) MOBILE FUEL DISPENSER (71) Applicant: MENA Energy, Dubai (AE)

(72) Inventors: Rashid Al Ghurair, Dubai (AE); Ryan Edward Rodgers, Dubai (AE); Antonio Al Asmar, Dubai (AE)

(73) Assignee: CAFU APP DMCC, Dubai (AE)

( * ) Notice: Subject to any disclaimer, the term of this patent is extended or adjusted under 35 U.S.C. 154(b) by 0 days.

(21) Appl. No.: 16/826,830

(22) Filed: Mar. 23, 2020

Related U.S. Application Data (60) Provisional application No. 62/912,384, filed on Oct. 8, 2019.

(51) Int. Cl.
B67D 7/04 (2010.01)
B67D 7/32 (2010.01)
B67D 7/54 (2010.01)
B67D 7/36 (2010.01)

(52) U.S. Cl.
CPC ............ B67D 7/048 (2013.01); B67D 7/3218 (2013.01); B67D 7/3227 (2013.01); B67D 7/36 (2013.01); B67D 7/54 (2013.01)

(58) Field of Classification Search
CPC ........ B67D 7/048; B67D 7/3227; B67D 7/38; B67D 7/54; B67D 7/049; B67D 7/36; B67D 7/3218; B60P 3/225; B60P 3/2215
USPC .......................................................... 141/59
See application file for complete search history.

(56) References Cited

U.S. PATENT DOCUMENTS 2,056,828 A * 10/1936 Clawson ................. B60P 3/224
141/290
2,421,765 A * 6/1947 Taylor ..................... B60P 3/243
222/135
2,439,887 A * 4/1948 Elliot ....................... B67D 7/54
141/290

(Continued)

FOREIGN PATENT DOCUMENTS

CA 2682772 C 11/2013
WO 1995009982 A1 4/1995

(Continued)

OTHER PUBLICATIONS

Franklin Fueling Systems, "Vapor Recovery Central Vacuum System", Manual No. 405116001, Mar. 2012.

(Continued)

Primary Examiner — Timothy L Maust
Assistant Examiner — James R Hakomaki
(74) Attorney, Agent, or Firm — Boyle Fredrickson, S.C.

(57) ABSTRACT

A mobile fuel delivery system and method are described for dispensing fuel in a poorly ventilated area. The system includes a fuel dispensing nozzle for dispensing the fuel; a cargo tank 16 for containing the fuel; a vapour recovery nozzle for recovering vapour from a fuel tank of a vehicle during fuelling; a sealing mechanism for sealingly engaging the fuel tank, a vapour tank 18; a pressure/vacuum release valve 20 connected between tank 16 and tank 18 and which is operable to increase/decrease pressure within tank 16 during dispensing of fuel and recovery of vapour recovered by the vapour recovery nozzle and pumped into the tank 16; and a safety mechanism including a control module 38 and a pressure detector 36 for detecting pressure within the tank 18, the module 38 being operable to stop fuel dispensing when pressure in tank 18 reaches a predetermined pressure.

11 Claims, 6 Drawing Sheets

(56) References Cited

U.S. PATENT DOCUMENTS

| | | | | |
|---|---|---|---|---|
| 2,498,229 | A * | 2/1950 | Adler | B60P 3/14 141/26 |
| 2,802,492 | A * | 8/1957 | Gosselin | F16K 35/14 141/307 |
| 2,928,436 | A * | 3/1960 | Wendrow | B67D 7/0478 141/105 |
| 3,477,611 | A * | 11/1969 | Niles | B60K 15/03 220/86.2 |
| 3,776,283 | A * | 12/1973 | Kramer | B60P 3/2255 141/45 |
| 3,826,291 | A * | 7/1974 | Steffens | B67D 7/0482 141/59 |
| 3,827,455 | A * | 8/1974 | Lee | B65D 90/503 137/375 |
| 3,908,718 | A * | 9/1975 | Bower | B67D 7/0478 141/59 |
| 3,996,975 | A * | 12/1976 | Hansel | B67D 7/0476 141/45 |
| 4,009,739 | A * | 3/1977 | Weatherford | B67D 7/0478 141/59 |
| 4,058,148 | A * | 11/1977 | Potter | B67D 7/048 141/198 |
| 4,131,214 | A * | 12/1978 | Rogers | B60P 3/225 222/1 |
| 4,245,681 | A * | 1/1981 | Guertin | B67D 7/52 141/206 |
| 4,320,788 | A * | 3/1982 | Lord | B67D 7/0478 137/255 |
| 4,988,020 | A * | 1/1991 | Webb | B60S 5/02 141/88 |
| 5,195,564 | A * | 3/1993 | Spalding | B67D 7/0486 141/1 |
| 5,285,920 | A * | 2/1994 | McGarvey | B65D 90/22 220/560.01 |
| 5,484,000 | A * | 1/1996 | Hasselmann | B67D 7/0476 141/45 |
| 5,494,409 | A | 2/1996 | Webb et al. | |
| 5,651,400 | A * | 7/1997 | Corts | B67D 7/365 141/198 |
| 5,823,235 | A * | 10/1998 | Alley | F17C 13/025 141/197 |
| 5,890,520 | A * | 4/1999 | Johnson, Jr. | B67D 7/067 141/94 |
| 5,956,259 | A * | 9/1999 | Hartsell, Jr. | B67D 7/0401 700/282 |
| 5,975,371 | A * | 11/1999 | Webb | B60S 5/02 137/376 |
| 5,983,962 | A * | 11/1999 | Gerardot | B60P 3/224 141/231 |
| 5,988,439 | A | 11/1999 | Webb | |
| 6,082,392 | A * | 7/2000 | Watkins, Jr. | B67D 7/002 137/312 |
| 6,176,275 | B1 | 1/2001 | Hill | |
| 6,216,719 | B1 * | 4/2001 | Meyer | B67D 7/3209 137/487.5 |
| 6,276,387 | B1 * | 8/2001 | Pachciarz | B60K 15/035 123/516 |
| 6,553,974 | B1 | 4/2003 | Wickman et al. | |
| 6,681,815 | B1 * | 1/2004 | Westrich | B67D 7/3218 141/198 |
| 9,815,683 | B1 * | 11/2017 | Kalala | B67D 7/362 |
| 10,046,962 | B2 | 8/2018 | Hall et al. | |
| 10,302,053 | B2 * | 5/2019 | Aso | F02M 37/0023 |
| 2007/0278248 | A1 * | 12/2007 | Van Vliet | B67D 7/84 222/133 |
| 2012/0241041 | A1 * | 9/2012 | Myers | B67D 7/72 141/1 |
| 2015/0013838 | A1 | 1/2015 | Polzin | |
| 2016/0362195 | A1 * | 12/2016 | Wilkinson | B67D 7/04 |
| 2017/0283240 | A1 * | 10/2017 | Wruck | B60P 3/225 |

FOREIGN PATENT DOCUMENTS

| | | |
|---|---|---|
| WO | 2002028714 A1 | 4/2002 |
| WO | 2010075563 A1 | 7/2010 |

OTHER PUBLICATIONS

Jeff Voorhis, P.E. EMS-LA, "Best Practices for Vapor Recovery Systems to Reduce Venting and Flaring," pp. 1-49.

Jeff Voorhis, P.E. EMS-LA, "Best Practices for Vapor Recovery Systems to Reduce Venting and Flaring," pp. 50-99.

* cited by examiner

MOBILE FUEL DISPENSER

INCORPORATION BY REFERENCE

This application is a US non-provisional patent application, which claims priority from U.S. Provisional Patent Application No. 62/912,384, filed on 8 Oct. 2019 and entitled "Mobile Fuel Dispenser", the entirety of which is hereby incorporated by reference.

FIELD OF INVENTION

This invention relates to a fuel dispenser and more specifically to a mobile fuel dispenser for carrying combustible liquid fuel and for safely dispensing the fuel during fuelling of a fuel tank of a vehicle located at a location remote from a fuel refilling station and at partially or wholly covered structure.

BACKGROUND TO INVENTION

There are numerous safety concerns with dispensing of fuel during fuelling of a fuel tank of a vehicle located at a location remote from a fuel refilling station. These safety concerns include the release of flammable and noxious vapours into the atmosphere. These safety concerns become even more concerning when the fuel is dispensed in a poorly ventilated area or semi-enclosed or indoor area, such as, for example, a covered or partially covered parking structure, an indoor or underground parking lot or parking garage.

There is a desire in the field for a mobile fuel dispenser which addresses or at least ameliorates some or all of these concerns.

SUMMARY OF INVENTION

The current invention has several aspects. According to one aspect of the invention there is provided a mobile fuel dispenser for carrying combustible liquid fuel and for dispensing the fuel during fuelling of a fuel tank of a vehicle located at a location remote from a fuel refilling station, the mobile fuel dispenser including:

a fuel dispensing nozzle for dispensing the fuel;

a primary containment tank for containing the fuel to be dispensed via the fuel dispensing nozzle;

a vapour recovery nozzle associated with the fuel dispensing nozzle, the vapour recovery nozzle being operable, in use, for recovering vapour from the fuel tank of the vehicle during fueling;

a sealing mechanism associated with the fuel dispensing nozzle and the vapour recovery nozzle and configured for sealingly engaging the fuel tank in an arrangement permitting dispensing of the fuel by the dispensing nozzle and recovery of the vapour from the fuel tank via the vapour recovery nozzle;

a secondary containment tank;

a pressure/vacuum release valve connected between the primary containment tank and the secondary containment tank and operable to decrease pressure within the primary containment tank during the recovery of vapour recovered by the vapour recovery nozzle and pumped into the primary containment tank, in use; and a safety mechanism including at least one detector for detecting an undesirable operational parameter of the mobile fuel dispenser, the safety mechanism being operable to stop fuel dispensing in response to detection of said undesirable operational parameter.

In a particular embodiment, the pressure/vacuum release valve may be operable to increase pressure within the primary containment tank, in use, during dispensing of fuel from the primary containment tank.

The pressure/vacuum release valve may be operable, in use, for releasing to the secondary containment tank, a pressure build-up in the primary containment tank resulting from recovery of vapour recovered by the vapour recovery nozzle. In use, the pressure/vacuum release valve may further be operable for preventing a vacuum from forming in the primary containment tank during dispensing of fuel from the primary containment tank. As such, the pressure/vacuum release valve is advantageously operable for normalizing pressure within the primary containment tank in a manner in which the contents of the primary containment tank are not exposed to the atmosphere.

In use, the sealing mechanism permits substantially vapourless dispensing of fuel from the primary containment tank and substantially vapourless recovery of vapour recovered by the vapour recovery nozzle.

The mobile fuel dispenser may further include a fuel pump for pumping the fuel from the primary containment tank to the fuel dispensing nozzle.

The mobile fuel dispenser may further include a vapour pump for pumping the vapour from the vapour recovery nozzle to the primary containment tank.

The safety mechanism may further include a control module configured for controlling operation of at least one of the fuel pump and the vapour recovery pump, in response to detection of said operational parameter by said at least one detector. In a particular embodiment, the control module may be configured for controlling operation of both of the fuel pump and the vapour recovery pump.

In a particular embodiment, said undesirable operational parameter which is detected by the detector, may be a state of operation of the vapour pump. As such, the control module may be operable to shut off the fuel pump in response to detection by the detector that the vapour pump is not in operation during fuel dispensing operations.

In another embodiment, said detector may be a pressure detector located in the secondary containment tank and said undesirable operational parameter which is detected by the pressure detector, may be a pressure in the secondary containment tank exceeding a particular pressure level. As such, the control module may be operable to shut off the fuel pump and the vapour pump in response to detection by the pressure detector that the pressure in the secondary containment tank exceeds said particular pressure level.

In a particular embodiment, the control module may be in the form of a hardware circuit, such as, for example, a hardware circuit comprising an electronic circuit board, circuit board logic chips and/or other electronic components.

In another embodiment, the control module may include a processor. The control module may further include a machine-readable medium having stored thereon instructions which, when executed, direct the operation of the processor. The processor may be one or more microprocessors, controllers, or any other suitable computing device, resource, hardware, software, or embedded logic.

The invention extends to a control module as described and defined hereinabove.

In yet another embodiment, the mobile fuel dispenser may further include a pressure release valve for releasing pressurized vapour from the secondary containment tank to the atmosphere, for purging the vapour from the secondary containment tank. In use, the pressure release valve may be activated to purge the vapour from the secondary containment tank to the atmosphere, when the pressure in the secondary containment tank exceeds said particular pressure. The mobile fuel dispenser may further include an additional pressure release valve for releasing pressurized vapour from the primary containment tank to the atmosphere, for purging the vapour from the primary containment tank. In use, the additional pressure release valve may be activated to purge the vapour from the primary containment tank to the atmosphere, when the pressure in the secondary containment tank exceeds said particular pressure.

In said embodiment wherein the mobile fuel dispenser includes one or more pressure release valves, the safety mechanism may further include one or more each sensor being configured for sensing that the mobile fuel dispenser is not in an at least partially enclosed area, the safety mechanism further being operable to prevent operation of the or each pressure release valve in response to absence of detection by the at least one sensor that the mobile dispenser is not in said at least partially enclosed area, and to allow operation of the or each pressure release valve, in response to detection by at least one sensor that the mobile fuel dispenser is not in said at least partially enclosed area, thereby to substantially reduce the release of vapour in said at least partially enclosed area. In a particular embodiment, said at least one sensor may be configured for detecting a speed of the mobile dispenser and, as such, the safety mechanism may be operable to prevent operation of the or each pressure release valve, in response to detection by the sensor that said speed is less than a particular speed.

The primary containment tank may be wholly located within the secondary containment tank. As such, the secondary containment tank may be operable to contain fluid leaking out of the primary containment tank in the event that there is a leak in the primary containment tank.

A size of the secondary containment tank may be selected such that the secondary containment tank is of a sufficiently large size to contain all of the vapour displaced from the fuel tanks of the vehicles, in use, when said fuel tanks are filled with the fuel contained in the primary containment tank. Either or both tanks may or may not be subject to pressure. In one exemplary embodiment, a high-pressure pump is provided for storing the vapours in a significantly small space.

According to another aspect of the invention there is provided a method of dispensing combustible liquid fuel for fuelling of a fuel tank of a vehicle located at a location remote from a fuel refilling station, the method including:

providing a mobile fuel dispenser for carrying and dispensing the fuel, the mobile fuel dispenser including a fuel dispensing nozzle, a vapour recovery nozzle; a primary containment tank for containing the fuel to be dispensed; and a secondary containment tank;

sealingly engaging the fuel tank of the vehicle with the fuel dispensing nozzle and the vapour recovery nozzle;

dispensing fuel from the primary containment tank into the fuel tank of the vehicle via the fuel dispensing nozzle;

recovering vapour from the fuel tank via the vapour recovery nozzle and delivering the recovered vapour to the primary containment tank;

decreasing pressure within the primary containment tank by venting vapour from the primary containment tank into the secondary containment tank;

detecting an undesirable operational parameter of the mobile fuel dispenser; and stopping fuel dispensing in response to detection of said undesirable operational parameter. In some embodiments, the recovering and storing of the vapours may be done in one or more of the primary tank, the secondary tank or a separate tank.

The step of detecting an undesirable operational parameter of the mobile fuel dispenser may, more particularly, comprise providing at least one detector for detecting said undesirable parameter via said at least one detector.

The step of decreasing pressure within the primary containment tank by venting vapour from the primary containment tank into the secondary containment tank may, more particularly, comprise providing a pressure/vacuum release valve connected between the primary containment tank and the secondary containment tank for decreasing pressure within the primary containment tank during recovery of vapour recovered by the vapour recovery nozzle and delivered into the primary containment tank, in use, by venting vapour from the primary containment tank into the secondary containment tank.

During dispensing of fuel from the primary containment tank, the method may further include increasing pressure within the primary containment tank.

The step of increasing pressure within the primary containment tank may, more particularly, include venting pressure from the secondary containment tank into the primary containment tank via the pressure/vacuum release valve.

The step of sealingly engaging the fuel tank of the vehicle with the fuel dispending nozzle and the vapour recovery nozzle may comprise providing a sealing mechanism associated with the fuel dispensing nozzle and the vapour recovery nozzle, said sealing mechanism being configured for sealingly engaging the fuel tank in an arrangement permitting dispending of the fuel by the fuel dispensing nozzle and recovery of the vapour from the fuel tank via the vapour recovery nozzle.

The method may include controlling operation of at least one of fuel dispensing and vapour recovery in response to detection of said operational parameter.

The step of controlling operation of at least one of fuel dispensing and vapour recovery may include providing a control module for controlling said operation of at least one of fuel dispensing and vapour recovery.

In a particular embodiment, the method may include detecting whether vapour recovery is operational and stopping fuel dispensing in response to detection of inadequate vapour recovery.

In another embodiment, the method may include detecting pressure within the secondary containment tank and stopping fuel dispensing in response to detection of pressure in the secondary containment tank exceeding a particular pressure level.

In yet another embodiment, the method may include releasing pressurized vapour from the secondary containment tank to the atmosphere, for purging the vapour from the secondary containment tank. More particularly, the method may include providing a pressure release valve for releasing said pressurized vapour from the secondary containment tank to the atmosphere, for purging the vapour from the secondary containment tank.

The method may include monitoring pressure within the secondary containment tank and as such said releasing pressurized vapour from the secondary containment tank to the atmosphere may be in response to detection that pressure within the secondary containment tank exceeding a particular pressure.

The method may include releasing pressurized vapour from the primary containment tank to the atmosphere, for purging the vapour from the primary containment tank. As such, the method may, more particularly, include providing an additional pressure release valve for releasing said pressurised vapour from the primary containment tank.

The releasing of pressurized vapour from the primary containment tank to the atmosphere may be in response to detection that the pressure in the secondary containment tank exceeds said particular pressure.

The method may include sensing that the mobile fuel dispenser is not in an at least partially enclosed area and preventing release of pressurized vapour to the atmosphere in the absence of sensing the mobile fuel dispenser is not in said at least partially enclosed area. The method may further include allowing release of pressurized vapour to the atmosphere when sensing that the mobile fuel dispenser is not in an at least partially enclosed area, thereby to substantially reduce the release of vapour in said partially enclosed area.

The step of sensing may comprise providing a sensor for said sensing. More particularly, the step of sensing may comprise sensing a speed of the mobile fuel dispenser for sensing that the mobile fuel dispenser is not in said at least partially enclosed area.

The step of providing the primary containment tank and the secondary containment tank may comprise providing the primary containment tank such that the primary containment tank is wholly located within the secondary containment tank.

A size of the secondary containment tank may be selected such that the secondary containment tank is of a sufficiently large size to contain all of the vapour displaced from the fuel tanks of the vehicles, in use, when said fuel tanks are filled with the fuel contained in the primary containment tank. In some embodiments, the secondary tank may be pressurised.

BRIEF DESCRIPTION OF DRAWINGS

Further features of the invention are described hereinafter by way of a non-limiting example of the invention, with reference to and as illustrated in the accompanying schematic drawings. In the drawings.

DESCRIPTION

Throughout the following description, specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

With reference to the drawings, a mobile fuel dispenser in accordance with the invention, in the form of a fuel delivery truck, is designated generally by reference numeral 10.

Referring to FIGS. 1 to 4 of the drawings, the fuel delivery truck 10 includes a wheeled truck body 12 and a fuel dispensing and vapour recovery apparatus 14 mounted on the wheeled truck body 12. Any mounting structure known in the art may be used to secure vapour recovery apparatus 14 to the wheel truck body.

The truck 10 is configured for carrying combustible liquid fuel, such as, for example, petrol or diesel and for dispensing the fuel during fuelling a fuel tank 44 of a vehicle 46 located at a location remote from a fuel refilling station (not shown). More particularly, the truck 10 is configured for dispensing the fuel in a poorly ventilated area or semi-enclosed or indoor area 50, such as, for example, a covered or partially covered structure, an indoor or underground parking lot or parking garage, without releasing into the poorly ventilated area undesirable levels of fumes from the fuel dispensing and vapour recovery apparatus 14 (or from the fuel tank of the vehicle being refuelled). It is to be understood that petrol or diesel are only examples of combustible fluids and are not intended to limit the definition of combustible fluid. It is also to be understood that combustible fluids are to include other combustible fluids known in the art such as but not limited to Hydrogen, Liquified Petroleum Gad (LPG), Compressed Natural Gas (CNG), etc.

The fuel dispensing and vapour recovery apparatus 14 includes a primary containment tank in the form of a cargo tank 16, a nozzle assembly, a secondary containment tank in the form of a vapour tank 18, a pressure/vacuum release valve 20 connected between the cargo tank 16 and the vapour tank 18. In some embodiments, cargo tank 16 may be wholly placed in vapour tank 18. This is shown in FIGS. 1 to 4. In other embodiments (not shown), the two tanks may be separate from one another such that each tank occupies a space independent from the other. In further additional embodiments (not shown), the tanks may be adjacent to one another so that a wall is shared between the two tanks.

Returning to the embodiments described in FIGS. 1 to 4, the fuel dispensing and vapour recovery apparatus 14 further includes a fuel pump 22, a vapour recovery pump 23, a fuel/vapour delivery line 24, pressure release valves 26.1, 26.2, a pneumatic air supply 27, a manual vapour release valve 28, an interlock 29 and a safety mechanism.

In an exemplary embodiment, cargo tank 16 is formed of 5 mm thick aluminium sheet material and is coated with 120 mins of fire-resistant paint. It is to be understood that other materials and paint known in the art may be used for making and coating cargo tank 16. The Applicant envisages that in another embodiment, the cargo tank 16 is formed from a plastics material. The plastics material is specifically a plastics material suitable for being subjected to increased pressure and highly resistant to chemicals being transported. Furthermore, the plastics material will be of sufficient strength and thickness to hold a sufficient volume of fuel, such as, for example, 1,000 litres of fuel). It is to be understood that other volumes more or less than 1,000 litres of fuel are contemplated in this invention.

Figure 3:
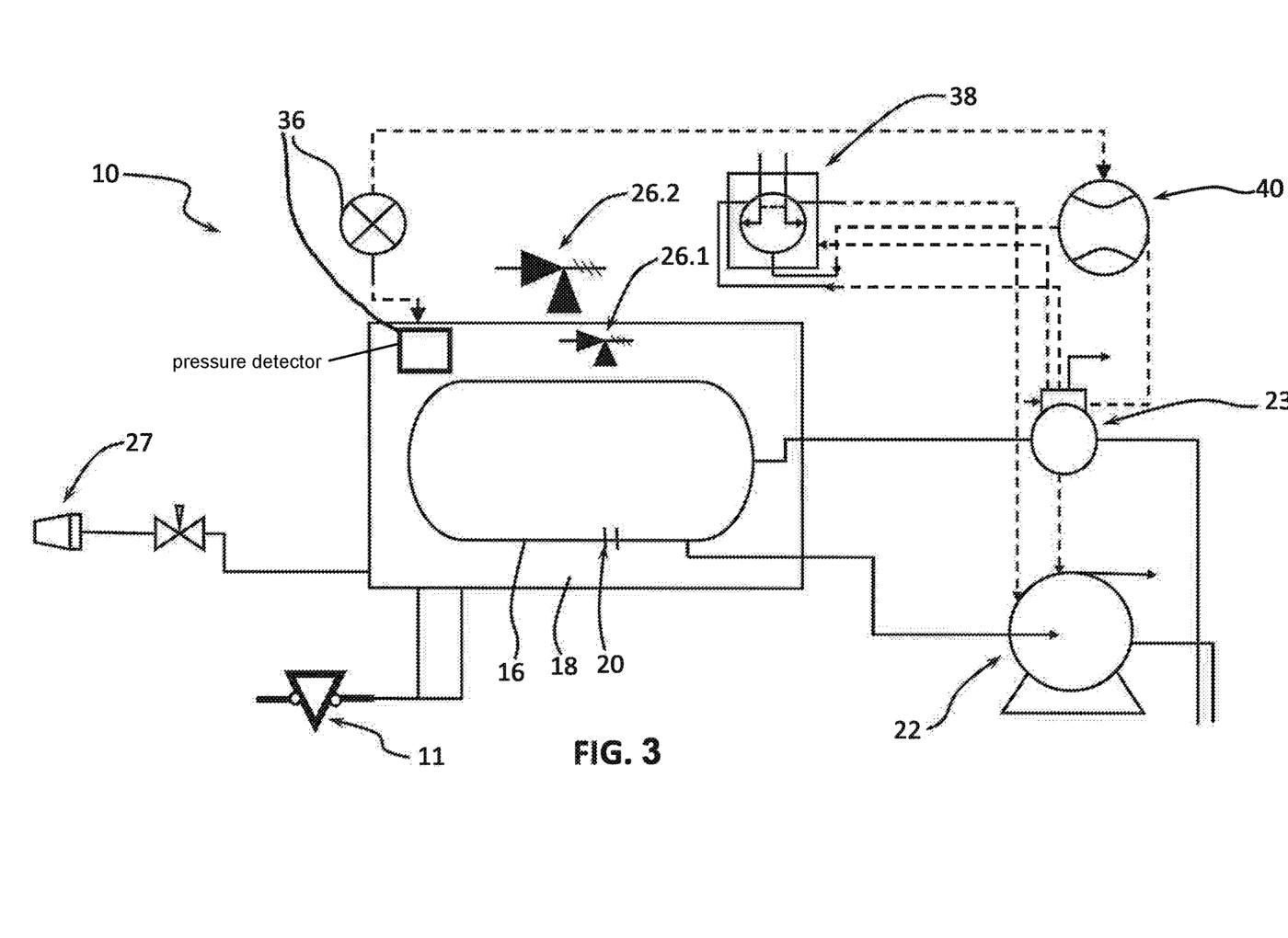
FIG. 3 shows a schematic diagram of the fuel dispensing and vapour recovery apparatus of the mobile fuel dispenser of FIG. 1.
Figure 4:
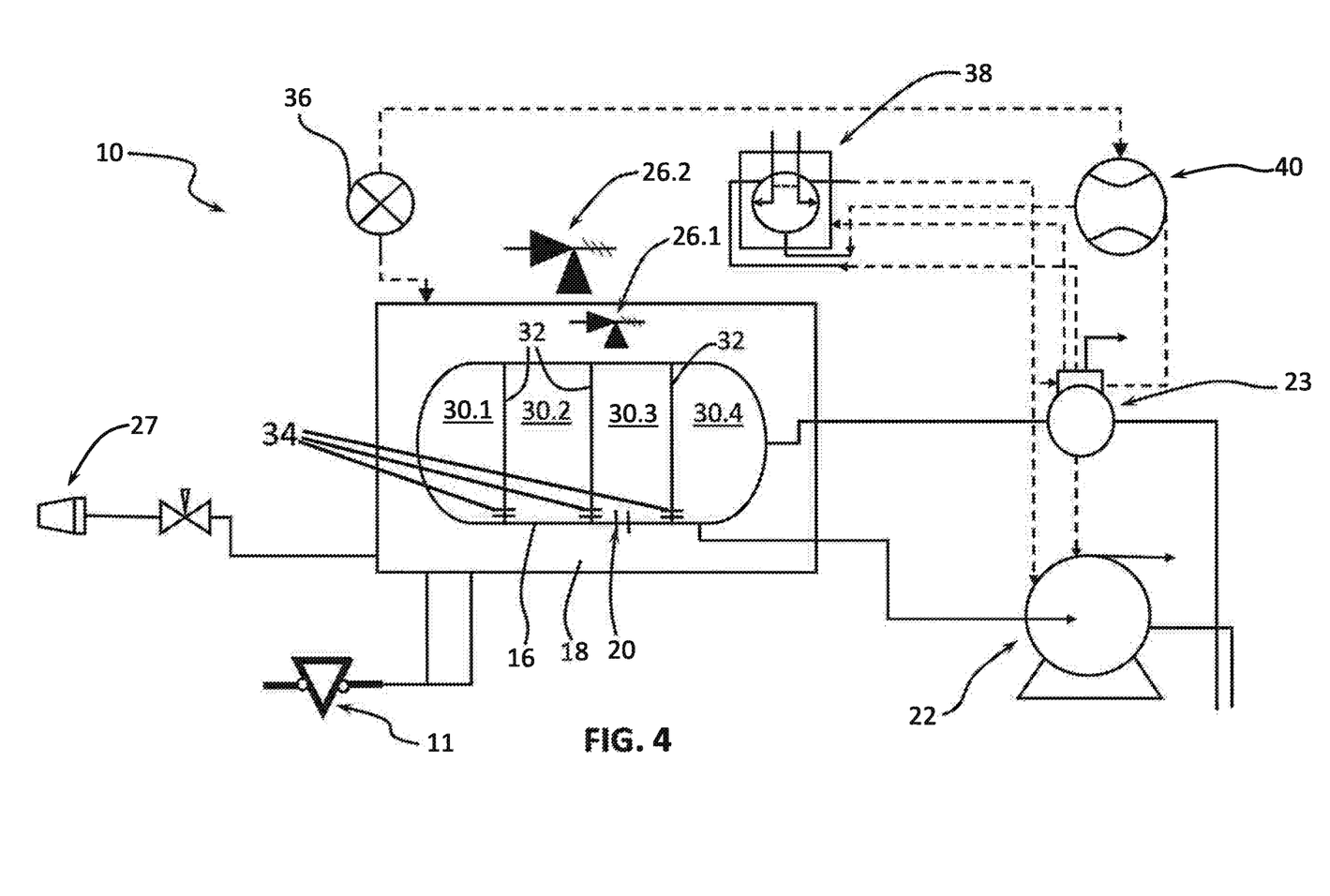
FIG. 4 shows a schematic diagram of the fuel dispensing and vapour recovery apparatus of a mobile fuel dispenser according to another embodiment of the invention.

As shown in the embodiment represented in FIG. 4, the internal space of cargo tank 16 is divided into four discreet chambers 30.1, 30.2, 30.3 and 30.4 of roughly equal size, by means of three equi-spaced baffles 32. Each baffle 32 has a valve 34 located therein for permitting or stopping flow communications between adjacent chambers 30.1, 30.2, 30.3 and 30.4. Each valve 34 is controlled electronically for displacing each valve between an open condition and a closed condition, as will be explained in more detail herein below. Each chamber 30.1, 30.2, 30.3 and 30.4 of cargo tank 16 is configured for containing and storing the fuel. FIG. 4 represents an exemplary embodiment of the invention. In other embodiments, it is to be understood that the number of chambers may vary. Also, in some embodiments, cargo tank 16 may be unitary in structure (i.e. without having any internal chambers). Such embodiment is represented in FIG. 3.

Cargo tank 16 may be configured to have a number of leak detectors (not shown) located at various locations on an outer surface of the cargo tank. The leak detectors may be configured for sending a signal to the safety mechanism in the event that a leak is detected, for reasons which will be explained below.

Cargo tank 16 may be fitted with a high-level float sensor 31 for sensing high levels of fuel in the cargo tank. The high-level float sensor 31 may be electronically connected to components of the safety mechanism for reasons which will be explained below. The high-level float sensor 31 may be also electronically connected to a high-level alarm (not shown) which alerts a user or operator of the truck 10 that the cargo tank has been filled to its maximum capacity.

Figures 5, 6:
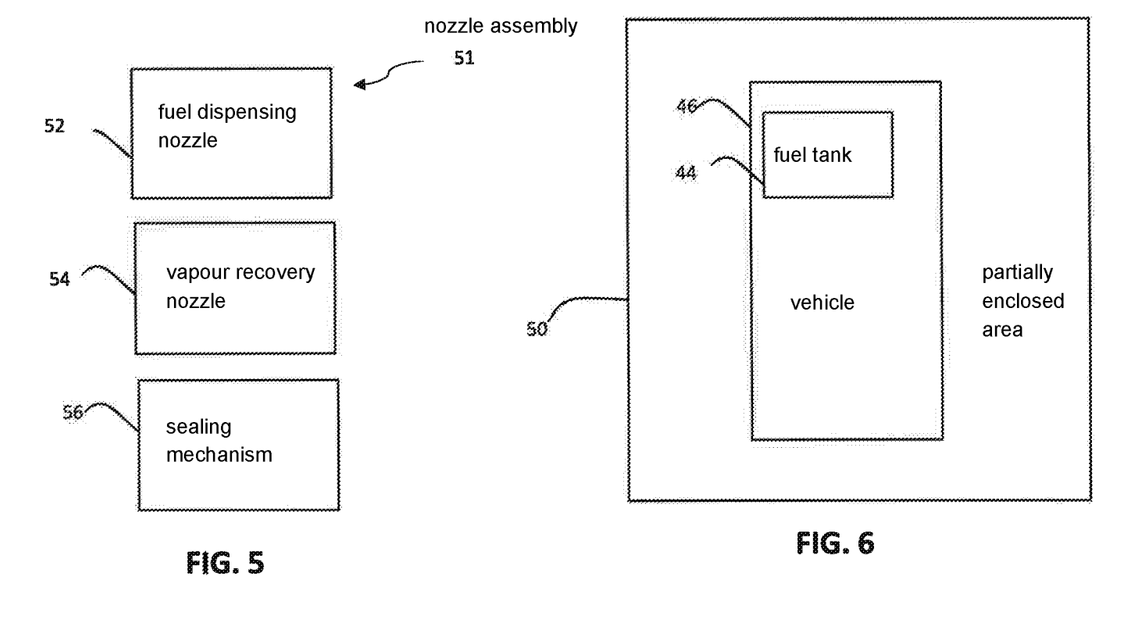
FIG. 5 shows a schematic diagram a nozzle assembly in accordance with the invention.
FIG. 6 shows a schematic diagram of a vehicle in a partially enclosed area.

The nozzle assembly 51 includes a fuel dispensing nozzle 52, a vapour recovery nozzle 54 and a sealing mechanism 56 associated with the fuel dispensing nozzle and the vapour recovery nozzle. The fuel dispensing nozzle is configured for dispensing fuel from the cargo tank. The vapour recovery nozzle is operable, in use, for recovering vapour from the fuel tank of the vehicle being fuelled during the fuelling process. The sealing mechanism is configured for sealingly engaging and coupling with the fuel tank in an arrangement permitting substantially vapourless operation of the fuel dispensing nozzle and the vapour recovery nozzle during operation thereof, i.e. during dispensing of the fuel by the dispensing nozzle and during recovery of the vapour from the fuel tank via the vapour recovery nozzle. The nozzle assembly is an industrial standard item and as such will not be described any further in this disclosure.

In some embodiments, the vapour recovery nozzle is in fluid communication with the cargo tank such that the vapour recovered by the vapour recovery nozzle is directed to the cargo tank, where such vapour is contained. The mechanism for purging such vapour from the cargo tank will be described below. In other embodiments, the vapour recovery nozzle may be in fluid communication with the vapour tank such that the vapour recovered by the vapour recovery nozzle is directed to the cargo tank, where such vapour is contained.

Referring back to the embodiments described FIGS. 1 to 4, in such exemplary embodiment, vapour tank 18 is formed of 5 mm thick aluminium sheet material and is coated with 120 mins of fire-resistant paint. It is to be understood that other materials and paint known in the art may be used for making and coating vapour tank 18.

As described above and shown in FIGS. 1, 3 and 4, which represent exemplary embodiments of the invention, cargo tank 16 is shown to be wholly positioned within vapour tank 18. The ratio and volume of vapour recovered during operation of the system is understood to be greater than the ratio and volume of the fuel capacity within the cargo tank.vapour. For optimum operation, it is preferred that vapour tank 18 be sized to contain at least all of the fuel contained in cargo tank if dispensed from cargo tank 16 to vapour tank 18. Also, by having cargo tank 16 wholly contained within vapour tank 18, this allows vapour tank 18 to contain fluid leaking from cargo tank 16, in the event of a leak in cargo tank 16. Additionally, the combined volume of the cargo and vapour tanks is to be of sufficient size to house all vapour that would be recovered if all fuel in the cargo tank is dispensed. In some embodiments (not shown), the vapour may be in compressed state. In such embodiments, for optimum operation, the vapour tank is to be sized to hold all of the vapour in its compressed state.

The size of the vapour tank 18 is further selected such that vapour tank 18 is of a sufficiently large size to contain the vapour that would otherwise be released to the air during fuelling. Such vapour include all of the vapour displaced from the fuel tanks of the vehicles as well as that released from the nozzle during the filling process, in use, when said fuel tanks are filled with the fuel contained in cargo tank 16. This ensures uninterrupted operation of the truck 10, in use, as will be described below.

Figure 1:
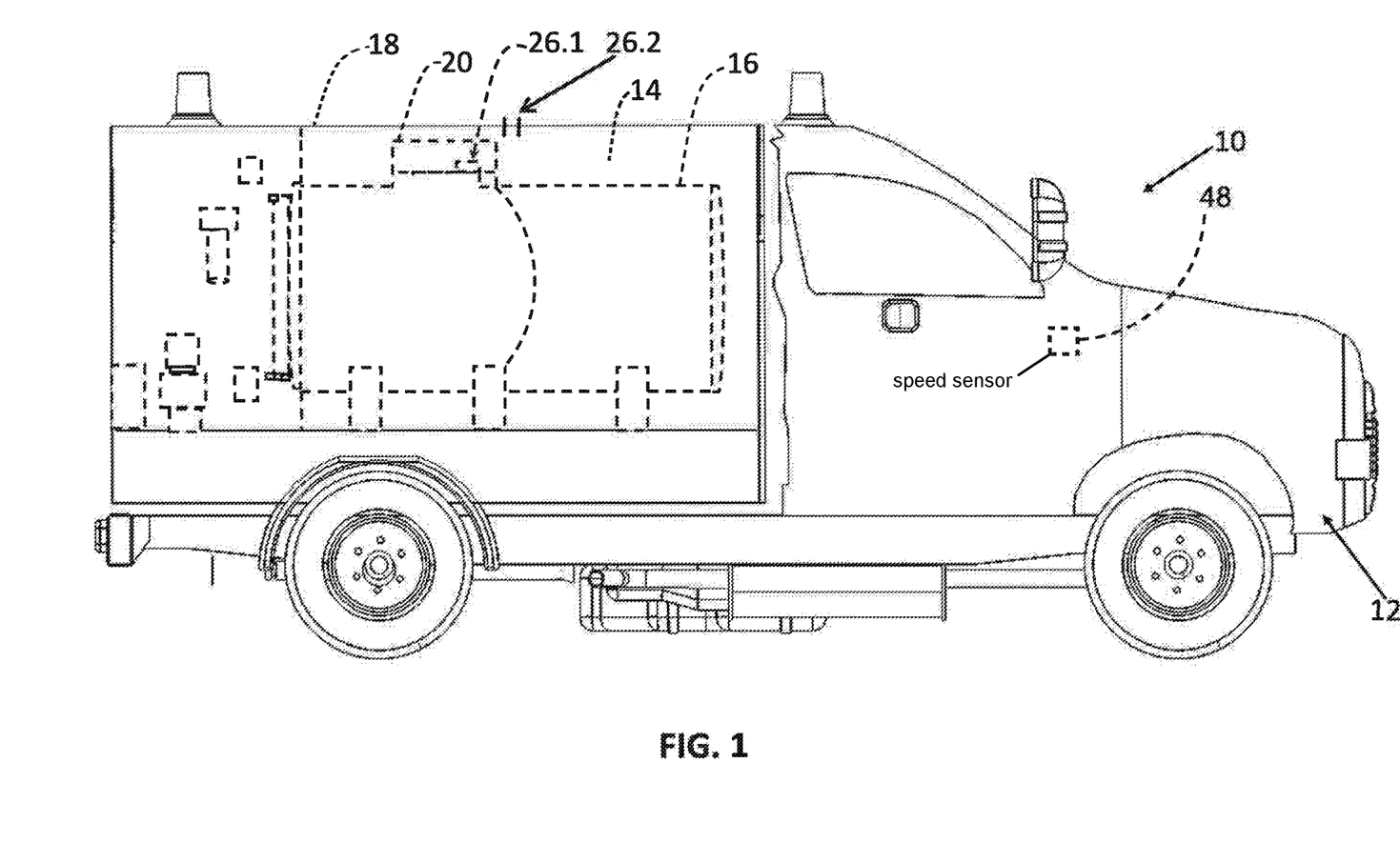
FIG. 1 shows a side view of a mobile fuel dispenser in accordance with an embodiment of the invention.
Figure 2:
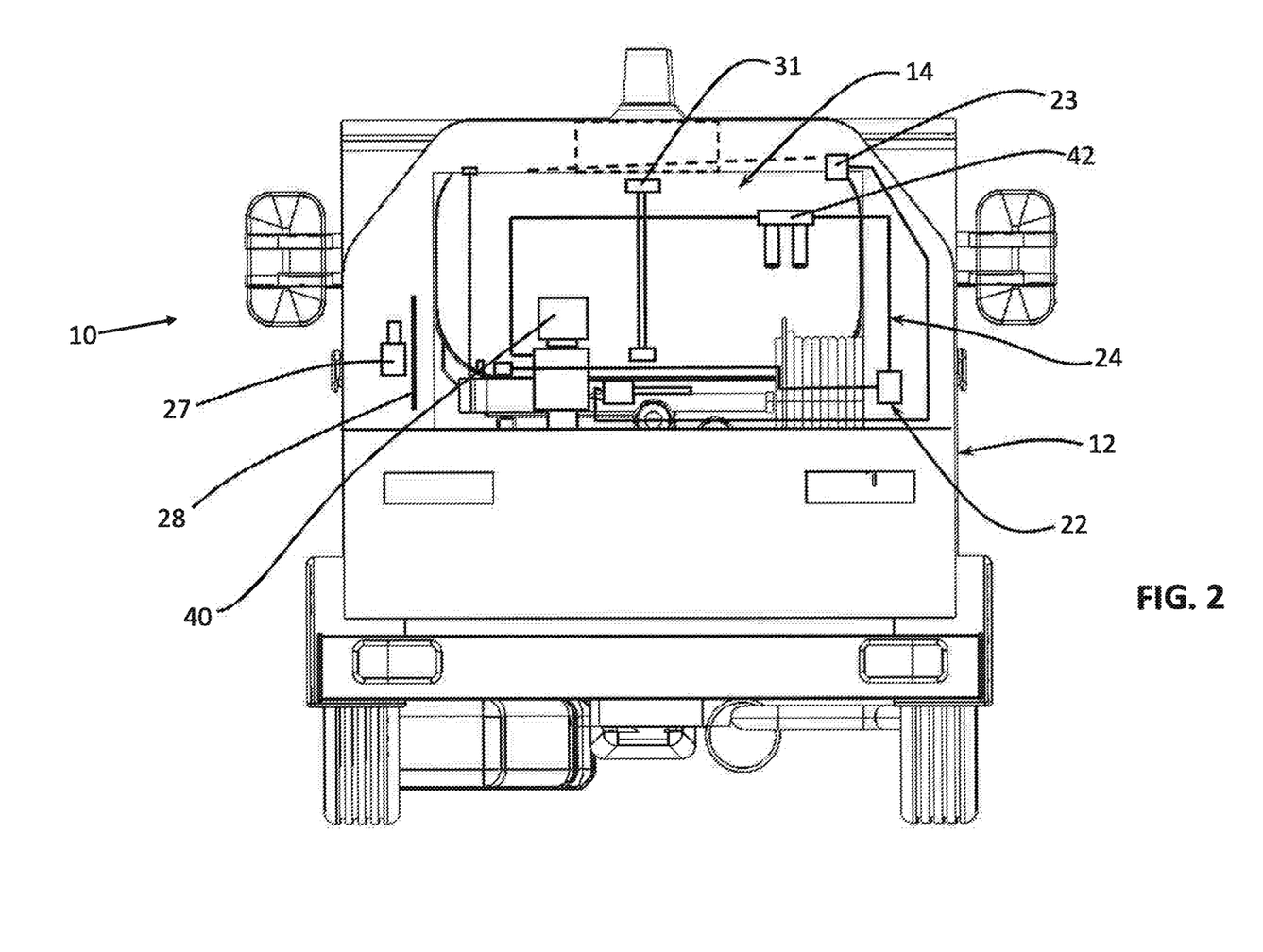
FIG. 2 shows a rear view of the mobile fuel dispenser of FIG. 1 and shows a partial view of a fuel dispensing and vapour recovery apparatus of the mobile fuel dispenser of FIG. 1.

In the embodiment represented in FIG. 1, pressure/vacuum release valve 20 is shown to be connected between cargo tank 16 and vapour tank 18. Pressure/vacuum release valve 20 is operable to reduce and/or increase pressure within cargo tank 16, in use, during dispensing of fuel from cargo tank 16 and during the recovery of vapour recovered by the vapour recovery nozzle and pumped into cargo tank 16, in use. In this regard it will be understood that during refilling operations, a low pressure (vacuum) condition or a high-pressure condition can develop in cargo tank 16.

For example, if cargo tank 16 is completely filled with fluid, a vacuum will form during fuelling operations (depending upon temperature/boil off) if insufficient vapour is transferred back into cargo tank 16, in use. Accordingly, in the example provided above, in use, pressure/vacuum release valve 20 is operable for preventing a vacuum from forming in cargo tank 16 during dispensing of fuel from cargo tank 16 by opening the pressure/vacuum release valve 20 to increase the pressure in cargo tank 16 and thereby equalizing pressure between vapour tank 18 and cargo tank 16. In some embodiments (not shown), where vapour may be released to the atmosphere without passing through the vapour tank, the pressure inside the cargo tank may be equalized by use of a pressure/vacuum release valve to control the air flow between the cargo tank and the outside of the tank. In such embodiments, an intermediary chamber may be used to facilitate either vapour release from the cargo tank to the outside atmosphere or the intake of air from the outside atmosphere into the cargo tank depending on the mode of operation of the system (i.e. fuel dispensing or filling of the cargo tang with fuel).

In embodiments, where the vapour is recovered into the cargo tank, if large quantities of vapour are recovered and delivered into cargo tank 16, an over pressure or high pressure may develop in cargo tank 16 which may cause structural damage to the cargo tank. To prevent this, pressure/vacuum release valve 20 is operable, in use, for opening and thereby releasing to the vapour tank 18 a pressure build-up in the cargo tank 16 resulting from recovery of vapour recovered by the vapour recovery nozzle. This pressure release ensures the pressure inside cargo tank 16 to not exceed the maximum allowable operating pressure, which is determined based on the size of the tank and other characteristics including its optimal volume and structural integrity.

As such, the pressure/vacuum release valve 20 is advantageously operable in such embodiment for normalizing pressure within the cargo tank 16 in a manner in which the contents of the cargo tank 16 are not directly exposed to the atmosphere.

Pressure/vacuum release valve 20 furthermore facilitates filling of cargo tank 16 when the cargo tank is being filled with fuel. More specifically, during filling of cargo tank 16, pressure/vacuum release valve 20 will open, and vent built-up pressure into vapour tank 18 as cargo tank 16 fills up and thereby become pressurized. In embodiments (not shown), where the venting of the vapour inside the cargo tank is possible without passing through the vapour tank, a pressure/vacuum release valve may be used to control venting such vapour into the atmosphere.

Referring back to the embodiment described in FIG. 3, the fuel pump 22 is configured for pumping the fuel from the cargo tank 16 to the fuel dispensing nozzle. Any type of suitable pump may be used, such as, for example, a ⅓ HP continuous duty pump which operates at a flow rate of approximately 25 gpa/95 lpm. It is advantageous if the output at the nozzle is approximately 24 lpm and must be at a rate which cannot result in static build up.

The vacuum pump 23 is configured for pumping the vapour from the vapour recovery nozzle to the cargo tank 16. In some embodiments (not shown), pump 23 may be configured to pump the vapour suctioned through the recovery nozzle directly into vapour tank 18.

In FIG. 3, fuel/vapour delivery line 24 includes a flow meter 40, vapour fuel separator, fuel/vapour hose, loading door, control valve, ball valve, dry coupler, cam lock coupler, actuator valve, emergency switch, sediment filter, water separator 42, and strainer, all of which are industrial standard components for use in the fuel/vapour delivery line 24. As such, these components will not be described in any further detail herein.

Pressure release valves 26.1, 26.2 are configured for releasing pressurized vapour from the vapour tank 18 and purging the vapour from vapour tank 18 into the atmosphere (under certain conditions and as will be explained in more detail below). Pressure release valve 26.1 is located on the cargo tank 16 and pressure release valve 26.2 is located on the vapour tank 18. In use, the pressure release valves 26.1, 26.2 are activated (under certain conditions and as will be explained in more detail below) to purge the vapour from vapour tank 18 and cargo tank 16, when the pressure in vapour tank 18 reaches the maximum allowed operating pressure, which may be predetermined based on the characteristics of the tank.

In FIG. 3, the pneumatic air supply 27 comprises a compressor (not shown) for supplying compressed and/or inert air for flushing out vapour from vapour tank 18, for purging tank 18 as will be explained in more detail hereinbelow. It is envisaged that in another embodiment (not shown) the pneumatic air supply may be suppled by exhaust gasses from the internal combustion engine of the vehicle.

The manual vapour release valve 28 is configured to allow the user of the truck 10 to manually release the vapour from the vapour tank 18 by manually activating the manual vapour release valve 28, as will be explained below.

The interlock 11 is configured for receiving an electronic or electrical signal for either locking or actuating the pressure release valves 26.1, 26.2, as will be explained in more detail hereinbelow.

The safety mechanism includes detectors, sensors and a control module 38. Each detector is configured for detecting at least one undesirable operational parameter of the truck 10. The detectors include a vapour pump operation detector (not shown) and a pressure detector 36 located in the vapour tank 18.

The vapour pump operation detector is configured for detecting a state of operation of the vapour pump 23. More particularly, the vapour pump operation detector is configured for detecting whether or not the vapour pump 23 is operational, i.e. operable for pumping vapour suctioned from the nozzle to the cargo tank 16 in the embodiment described in FIG. 3 or to vapour tank 18 in other embodiments. For example, in a particular embodiment, the vapour pump operation detector is more specifically configured for detecting an electrical current supplied to the vapour pump 23 to establish that the vapour pump 23 is operating.

In FIG. 3, pressure detector 36 is configured for detecting when a pressure in vapour tank 18 reaches a predetermined pressure level such as the maximum allowed operating pressure.

The sensors are configured for sensing whether or not truck 10 is in an at least partially enclosed area 50. Various sensory data and corresponding sensors known in the art may be used to establish this. Such sensors may be integrated into the vehicle or may be external to it. For example, a speed sensor 48 for sensing a speed of the truck 10 may be used. Based on the assumption that a vehicle travels slower in parking structures compared to outside parking structures, the speed may be used to determine if the truck 10 is in an area, such as partial enclosed areas 50 or parking spaces, that obstructs driving with speed.

The control module 38 is configured to actuate interlock 11 so as to open the pressure release valves 26.1, 26.2 and to actuate pneumatic air supply 27 when the speed sensor detects that the speed of the truck 10 is more than a particular predetermined speed, such as, for example, 45 km/hr, thereby to release pressurized vapour from the vapour tank 18 for purging the pressure and vapour from the vapour tank so as to return pressure in the vapour tank 18 to atmospheric pressure and inert state. More specifically, the control module 38 is operable to ensure that vapour is not released from the truck 10 when the truck 10 is in a poorly ventilated and/or confined area because the control module 38 only actuates interlock 11 so as to open the pressure release valve 26 when the speed of the truck 10 is more that said particular predetermined speed. As such, the control module 38 ensures that the vapour is only released once the truck 10 is in the "open road", i.e. traveling at speeds which would not be possible if the vehicle was in a confined area, for example, in a poorly ventilated confined space, such as, for example a parking garage. Use of other sensory data in addition to speed or in place of it for this purpose is contemplated according to other embodiments as will be described below.

The control module 38 is furthermore operable, via operation of interlock 11, to prevent operation of the pressure release valves 26.1, 26.2, in response to detection by the speed sensor that said speed is less than a particular predetermined speed, such as, for example, 35 km/hr. In this way, the truck 10 can safely dispense fuel even in extremely confined and poorly ventilated spaces, as the control module 38 ensures that the pressure release valves 26.1, 26.2 cannot be opened while the vehicle is in the confined space. It is to be understood that the speeds mentioned above are only exemplary and not limiting. So, the control module may be configured to control operation of the pressure release valve based on different predetermined speeds.

Furthermore, to ensure that vapour is not unintentionally released by the truck, the control module 38 is furthermore configured for stopping fuel dispensing in response to detection by the vapour pump operation detector that the vapour pump 23 is not operational or is operating at sub-optimal levels. More specifically, the control module 38 is configured for controlling operation of the fuel pump 22 and the vapour recovery pump 23, for stopping the fuel pump 22 and the vapour recovery pump 23, in response to detection by the vapour pump operation detector that the vapour pump 23 is below optimal conditions. To further ensure that vapour is not unintentionally released by the truck, the control module 38 is furthermore configured for stopping fuel dispensing in response to detection that the valves 26.1, 26.2 are in the incorrect positions.

As an additional safety feature of the safety mechanism to prevent unintended release of vapour from the truck 10, the control module 38 is furthermore operable to shut off the fuel pump 22 and the vapour recovery pump 23 in response to detection by the pressure detector 36 that the pressure in the vapour tank 18 has reached a particular pressure level, such as the maximum allowed operational pressure. As such, this is an extremely advantageous safety feature which ensures safe dispensing of fuel in confined and poorly ventilated spaces, as it ensures that fuel cannot be dispensed in circumstances in which the pressure in the vapour tank 18 is at the maximum allowed operating pressure. This also ensure vapour free delivery of fuel when refilling the fuel tank of the vehicle in a confined space. In this regard, it will be understood that if the pressure in the vapour tank 18 is indicative of the tank containing vapour at full capacity, if the system were to operate and not shutdown, it will not be possible for the vapour recovery nozzle to properly operate so as to ensure substantially vapour free delivery of fuel during refuelling operations.

Furthermore, as an additional safety feature of the safety mechanism to prevent unintended release of vapour from the truck 10, when the pressure in the vapour tank 18 is at a critical level (i.e. close to the maximum allowed operating pressure) and the control module 38 prevents further fuel dispensing as described above, then the vehicle operator will have to follow one of the following two available options, in order to reduce the pressure in vapour tanks 18:

(1) the operator can simply drive the truck 10 at a speed in excess of the aforementioned exemplary predetermined speed of 45 km/h so as to allow the control module 38 to activate interlock 11, as described above, so as to open valves 26.1, 26.2 and actuate the pneumatic air supply 27 so as to release vapour from the vapour tank 18 and purge the vapour from vapour tank 18 and return the pressure in vapour tank 18 to atmospheric pressure as described above; or (2) alternatively, if it is not convenient or practical to drive the vehicle in excess of 45 km/h, then the operator can drive the truck 10 to a well ventilated area and manually actuate the manual vapour release valve 28 to manually release the vapour from the vapour tank 18 for returning the pressure in the vapour tank 18 to atmospheric pressure.

In the embodiment described in FIG. 3, As an additional safety feature, the control module 38 is furthermore configured for controlling the valves 34 in the baffles 32 of cargo tank 16 for displacing these valves 34 between open and closed positions. In use, when a signal is received from a particular leak detector, indicating that there is a leak, the control module 38 is operable to close a particular valve 34 located in a particular one of the baffles 32 in the proximity of the leak, in order to isolate the leaking chamber, in order to reduce the loss of fuel from the cargo tank 16 and thereby to limit the loss only to the leaking chamber. In other embodiments, all valves 34 are closed in case of a leak detection by one or more sensors.

As an additional safety feature, during filling of the cargo tank 16 with fuel, in use, the control module 38 is furthermore configured to close one or more of the ball valve, control valve and actuator valves, in response to receipt of a signal from the high-level float sensor 31, which signal indicates that the cargo tank 16 is full. This prevents overfilling of the cargo tank 16.

The control module 38 is in the form of a hardware circuit comprising an electronic circuit board, circuit board logic chips and other electronic components. In another embodiment (not shown), the control module may include a processor configured for performing the operational functions of control module 38. The control module may further include a machine-readable medium having stored thereon instructions which, when executed, direct the operation of the processor. The processor may be one or more microprocessors, controllers, or any other suitable computing device, resource, hardware, software, or embedded logic.

The fuel delivery truck 10 is advantageous over the prior art due to the arrangement of cargo tank 16 and vapour tank 18 and the pressure/vacuum release valve 20 connected between them, which is operable to reduce and/or increase pressure within the cargo tank 16, in use, during dispensing of fuel from the cargo tank 16 and during the recovery of vapour recovered by the vapour recovery nozzle and pumped the maximum allowed operational pressure into cargo tank 16 in some embodiments or tank 18 in other embodiments. More specifically, the pressure/vacuum release valve 20 advantageously normalises pressure within cargo tank 16 in a manner in which the flammable and noxious contents of cargo tank 16 and vapour tank 18 are not exposed to the atmosphere when the truck 10 is performing refilling operations in a poorly ventilated confined space, such as, for example a parking garage. As such, substantially vapourless refuelling operations can safely be performed by truck 10, even in extremely poorly ventilated places.

It will be appreciated that the exact configuration of the truck 10, in accordance with the invention, may vary greatly while still incorporating the essential features of the invention as described hereinabove. For example, the sensors configured for sensing whether or not the truck 10 is in an at least partially enclosed area may differ from the speed sensor described herein above. More specifically, the sensors may be in the form of proximity sensors (not shown) located on the truck 10 for determining nearby objects such as walls and ceilings thereby for sensing that the mobile fuel dispenser is not in an at least partially enclosed area. The proximity sensors (not shown) may be configured for emitting electromagnetic fields or a beam of electromagnetic radiation (e.g. infrared) and determine changes in the field or return signal. Other sensors known in the field for detecting position and environmental data may be used in this invention. Also, it is also contemplated that some or all sensors integrated into the vehicle for determining surrounding and position of the vehicle may be incorporated as feeds for the processor or control module to determining the state of the vehicle and thereby control its operational mode and venting of the vapour into the atmosphere. It is also to be understood that the control module may be connected to the computer system of the vehicle to obtain all sensory data collected by such computer to perform its functions as described above.

The invention extends also to the control module 38 and the method of operating the system using the control module as described and defined hereinabove.

Figure 7:
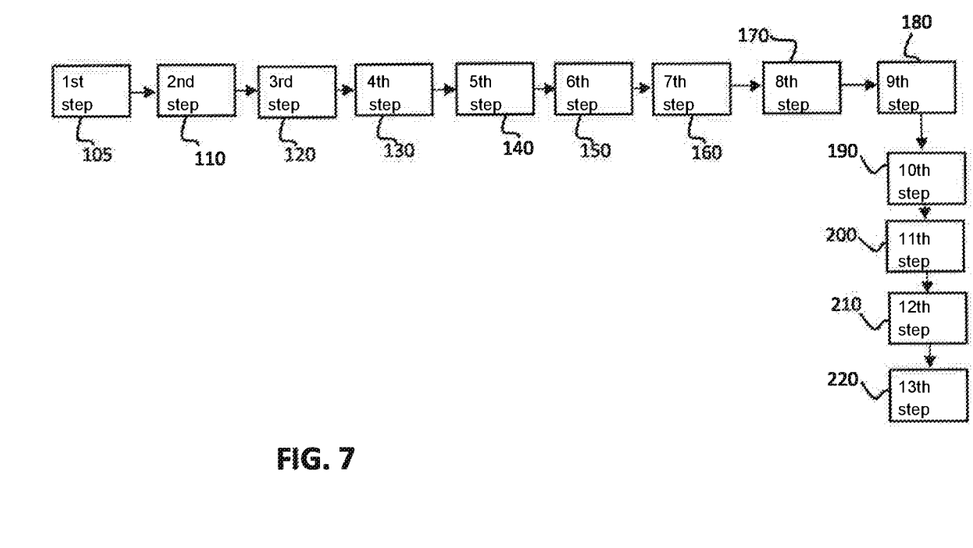
FIG. 7 shows a flowchart illustrating the method of the invention.

FIG. 7 of the drawings illustrates the method of dispensing combustible liquid fuel for fuelling of a fuel tank of a vehicle located at a location remote from a fuel refilling station, the method comprises:

in a first step 105, providing a mobile fuel dispenser for carrying and dispensing the fuel, the mobile fuel dispenser including a fuel dispensing nozzle, a vapour recovery nozzle; a primary containment tank for containing the fuel to be dispensed; and a secondary containment tank;

in a second step 110, sealingly engaging the fuel tank of the vehicle with the fuel dispensing nozzle and the vapour recovery nozzle;

in a third step 120, dispensing fuel from the primary containment tank into the fuel tank of the vehicle via the fuel dispensing nozzle;

in a forth step 130, recovering vapour from the fuel tank via the vapour recovery nozzle and delivering the recovered vapour to the primary containment tank;

in a fifth step 140, decreasing pressure within the primary containment tank by venting vapour from the primary containment tank into the secondary containment tank;

in a sixth step 150, detecting an operational parameter of the mobile fuel dispenser;

in a seventh step 160 stopping fuel dispensing in response to detection of said operational parameter such as at least one of detecting inadequate vapor recovery or detecting pressure in the secondary containment tank exceeding a particular pressure level;

in an eight step 170, releasing pressurized vapour from the secondary containment tank to the atmosphere, for purging the vapour from the secondary containment tank;

in a ninth step 180, controlling operation of at least one of fuel dispensing and vapour recovery in response to detection of said operational parameter;

in a tenth step 190, releasing pressurized vapour from one of the primary containment tank or the secondary containment tank to the atmosphere, for purging the recovered vapour;

in an eleventh step 200, sensing whether the mobile fuel dispenser is in an at least partially enclosed area or not, such as sensing a speed of the mobile fuel dispenser and determining if the mobile fuel dispenser is in said at least partially enclosed area or not based on the sensed speed;

in a twelfth step 210, preventing release of pressurized vapour to the atmosphere when the mobile fuel dispenser is in said at least partially enclosed area; and in a thirteenth step 220, allowing release of pressurized vapour to the atmosphere when the mobile fuel dispenser is not in said at least partially enclosed area.

Interpretation of Terms

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

"Vehicle" shall be interpreted sufficiently broadly to include any type of a vessel, vehicle or craft for transport on water, land, or in air. Also, "fuel tank" shall be interpreted to mean a fuel tank of said vessel, vehicle or craft.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", "upper", "lower" and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of device and method have been described herein for purposes of illustration. These are only examples. The technology provided herein can be applied to device and method other than the examples described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

We claim:

1. A mobile fuel dispenser for carrying combustible liquid fuel and for dispensing the fuel during fuelling of a fuel tank of a vehicle located at a location remote from a fuel refilling station, the mobile fuel dispenser including:

a fuel dispensing nozzle for dispensing the fuel;

a primary containment tank for containing the fuel to be dispensed via the fuel dispensing nozzle;

a vapor recovery nozzle associated with the fuel dispensing nozzle, the vapor recovery nozzle being operable, in use, for recovering vapor from the fuel tank of the vehicle during fueling;

a sealing mechanism associated with the fuel dispensing nozzle and the vapor recovery nozzle and configured for sealingly engaging the fuel tank in an arrangement permitting substantially vapourless dispensing of the fuel by the dispensing nozzle and recovery of the vapor from the fuel tank via the vapor recovery nozzle;

a secondary containment tank;

a pressure release valve connected between the primary containment tank and the secondary containment tank and operable to decrease pressure within the primary containment tank during the recovery of vapour recovered by the vapor recovery nozzle and pumped into the primary containment tank, in use;

a fuel pump for pumping the fuel from the primary containment tank to the fuel dispensing nozzle;

a vapor pump for pumping the vapor from the vapor recovery nozzle to the primary containment tank; and a safety mechanism comprising at least one detector for detecting an undesirable operational parameter of the mobile fuel dispenser, the safety mechanism being operable to stop fuel dispensing in response to detection of said undesirable operational parameter;

wherein the safety mechanism comprises a control module configured for controlling operation of the fuel pump in response to detection of said undesirable operational parameter by said at least one detector, wherein the undesirable operational parameter detected by the detector is a state of operation of the vapor pump, and wherein the control module is configured to shut off the fuel pump in response to detection by the detector that the vapor pump is not in operation during fuel dispensing operations.

2. The mobile fuel dispenser in claim 1, wherein the pressure release valve is operable to increase pressure within the primary containment tank, in use, during dispensing of fuel from the primary containment tank.

3. The mobile fuel dispenser in claim 1, wherein the pressure release valve is operable, in use, for releasing to the secondary containment tank, a pressure build-up in the primary containment tank resulting from recovery of vapour recovered by the vapor recovery nozzle.

4. The mobile fuel dispenser of claim 1 further comprising a pressure release valve for releasing pressurized vapor from the secondary containment tank to the atmosphere, for purging the vapor from the secondary containment tank.

5. The mobile fuel dispenser of claim 4 further comprising an additional pressure release valve for releasing pressurized vapor from the primary containment tank to the atmosphere, for purging the vapor from the primary containment tank.

6. The mobile fuel dispenser of claim 4, wherein the safety mechanism further comprises one or more sensors, each of the one or more sensor configured for sensing if the mobile fuel dispenser is in an at least partially enclosed area, the safety mechanism further configured to prevent operation of the one or more pressure release valve in response to detection by the one or more sensors that the mobile dispenser is in said at least partially enclosed area, and to allow operation of the one or more pressure release valve, in response to detection by one or more sensors that the mobile fuel dispenser is not in said at least partially enclosed area, thereby to substantially reduce the release of vapor in said at least partially enclosed area; and wherein the one or more sensors include a speed sensor configured for detecting a speed of the mobile dispenser, wherein the speed sensor is integrated with or external of the vehicle, and wherein the safety mechanism is configured to prevent operation of the one or more pressure release valve in response to detection by the one or more sensors that said speed is less than a particular speed.

7. A method of dispensing combustible liquid fuel for fuelling of a fuel tank of a vehicle located at a location remote from a fuel refilling station, the method comprises:

providing a mobile fuel dispenser for carrying and dispensing the fuel, the mobile fuel dispenser including a fuel dispensing nozzle, a vapor recovery nozzle; a primary containment tank for containing the fuel to be dispensed; and a secondary containment tank;

sealingly engaging the fuel tank of the vehicle with the fuel dispensing nozzle and the vapor recovery nozzle;

dispensing fuel from the primary containment tank into the fuel tank of the vehicle via the fuel dispensing nozzle;

recovering vapor from the fuel tank via the vapour recovery nozzle and delivering the recovered vapor to the primary containment tank;

decreasing pressure within the primary containment tank by venting vapour from the primary containment tank into the secondary containment tank;

detecting an operational parameter of the mobile fuel dispenser, and stopping fuel dispensing in response to detection of said operational parameter, wherein the step of stopping fuel dispensing is in response to detecting inadequate vapour recovery.

8. The method of claim 7 further comprises releasing pressurized vapor from the secondary containment tank to the atmosphere, for purging the vapor from the secondary containment tank.

9. The method of claim 7 further comprises releasing pressurized vapor from one of the primary containment tank or the secondary containment tank to the atmosphere, for purging the recovered vapor.

10. The method of claim 7 further comprising:

sensing whether the mobile fuel dispenser is in an at least partially enclosed area or not;

preventing release of pressurized vapor to the atmosphere when the mobile fuel dispenser is not in said at least partially enclosed area; and allowing release of pressurized vapor to the atmosphere when the mobile fuel dispenser is not in an at least partially enclosed area.

11. The method of claim 10, wherein the step of sensing comprises sensing a speed of the mobile fuel dispenser and determining if the mobile fuel dispenser is in said at least partially enclosed area or not based on the sensed speed.

* * * * *

UNITED STATES PATENT AND TRADEMARK OFFICE
CERTIFICATE OF CORRECTION

PATENT NO. : 10,850,971 B1  
APPLICATION NO. : 16/826830  
DATED : December 1, 2020  
INVENTOR(S) : Rashid Al Ghurair, Ryan Edward Rodgers and Antonio Al Asmar Page 1 of 1

It is certified that error appears in the above-identified patent and that said Letters Patent is hereby corrected as shown below:

On the Title Page

Item (72) reflect the applicants name, as, -- Ryan Edward Rogers -- instead of -- Ryan Edward Rodgers --.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*